United States Patent [19]

Deaver et al.

[11] 4,348,739

[45] Sep. 7, 1982

[54] TERMINAL PROVIDING COMMUNICATION SYSTEM INFORMATION OUTPUT

[75] Inventors: Randall L. Deaver, Boulder; Thomas J. Freund, Longmont; Patrick J. Gerstle, Boulder, all of Colo.

[73] Assignee: International Business Machines Corporation, Armonk, N.Y.

[21] Appl. No.: 120,941

[22] Filed: Feb. 12, 1980

[51] Int. Cl.³ .............................................. G06F 3/04
[52] U.S. Cl. .................................................. 364/900
[58] Field of Search ............................... 364/200, 900

[56] References Cited

U.S. PATENT DOCUMENTS

| Re. 29,450 | 10/1977 | Goldsby et al. | 340/150 |
|---|---|---|---|
| 3,292,156 | 12/1966 | Stochel | 364/900 |
| 3,309,673 | 3/1967 | Harris et al. | 364/900 |
| 3,564,509 | 2/1971 | Perkins et al. | 364/200 |
| 3,651,471 | 3/1972 | Haselwood et al. | 364/900 |
| 3,701,971 | 10/1972 | Sanner et al. | 364/200 |
| 3,882,305 | 5/1975 | Johnstone | 364/200 X |
| 3,905,023 | 9/1975 | Perpiglia | 364/200 |
| 3,980,839 | 9/1976 | Hutcheson | 179/175.2 R |
| 4,062,061 | 12/1977 | Batchelor et al. | 364/900 |
| 4,089,056 | 5/1978 | Barna et al. | 364/551 |

Primary Examiner—Raulfe B. Zache
Attorney, Agent, or Firm—Carl M. Wright; John H. Holcombe

[57] ABSTRACT

A terminal connected to a data communication system and has an output device such as a printer or display and has a memory. The terminal stores the handshaking information received by the terminal from the data communication system as a communication session is established, translates the stored handshaking information into a suitable format for the output device, and supplies the translated data to the output device to inform the operator of the nature of the data communication system.

3 Claims, 10 Drawing Figures

TERMINAL PROVIDING COMMUNICATION SYSTEM INFORMATION OUTPUT

DOCUMENTS INCORPORATED BY REFERENCE

The present invention employs apparatus set forth in commonly assigned U.S. Pat. No 4,123,155, Hubert, issued Oct. 31, 1978, filed Oct. 4, 1976.

U.S. Pat No. 4,000,486, Schomburg, issued Dec. 28, 1976, filed Dec. 22, 1975 discloses the printer apparatus employed with the present invention.

BACKGROUND OF THE INVENTION

The invention relates to communication terminals, and in particular to terminals having an output device providing human-understandable information.

Previously, terminal devices were allowed to communicate in a communication system after executing precise protocols and the exchange of information allowing those devices expected to be in the communication session to select the proper logic and formats. In this manner, they would be consistent. This exchange of information is known as "handshaking," and once the communication session was established the information was not kept and became lost, except possibly for an error log kept at a host system for the communication system. The "handshaking" procedure, if successful, therefore appeared transparent to the terminal operator because the operator was largely inactive during the procedure. Rather, only the preset logic of each of the machines was involved.

The operator was informed when the session was established, or informed that the session attempt was unsuccessful. If successful, the terminal operator normally proceeded with one or more exchanges employing the terminal, including communication with the communication system over the established session.

Often, only after the operator has completed preparatory work and begins an active session, did the operator learn that the session could not be fruitful because the session or the communication system was not exactly the same as was expected. Examples include: the central processing unit to which the session is established is not the type expected; a desired device of the communication system is not on line; the format required for the established data session is different than that for which the operator has prepared. The operator must then either wait until another time to reestablish the session and conduct his exchange, or redo much of his preparatory work in view of the differing circumstances.

SUMMARY OF THE INVENTION

It is an object of this invention to provide a terminal in a communication system which automatically supplies, upon establishment of a communication session therebetween, operator readable information of the characteristics of the data communication system.

In accordance with this invention, a terminal is connectable to a data communication system to establish a data communication session via exchange of handshaking information. The terminal has a memory for storing the handshaking information received by the terminal from the data communication system, apparatus for supplying information representing certain of the stored handshaking information in a suitable format, and an output device for providing operator readable data representative of the supplied information.

DETAILED DESCRIPTION

One of the primary uses of an intelligent copier/printer, such as the IBM 6670, is as a remote terminal connectable to a data communication system including a host central processing unit. The intelligent copier/printer may thus serve as an input/output work station for both casual and sophisticated operators.

In some communication protocols, such as the IBM Systems Network Architecture, or SNA, the characteristics for a particular data exchange are presented initially upon establishment of the connection between the remote terminal and the data communication system. This connection is defined as a "session." The exchange of data made upon establishment of the data session is defined as "handshaking" information.

Information to assist the remote operator in the communications data exchange is important for efficient usage of the work station. The capabilities and options available to the operator are dependent upon the host system and the application of that system to which the terminal is connected. This invention presents the characteristics for a particular data exchange to the operator automatically in an easily understandable format.

Figure 1:
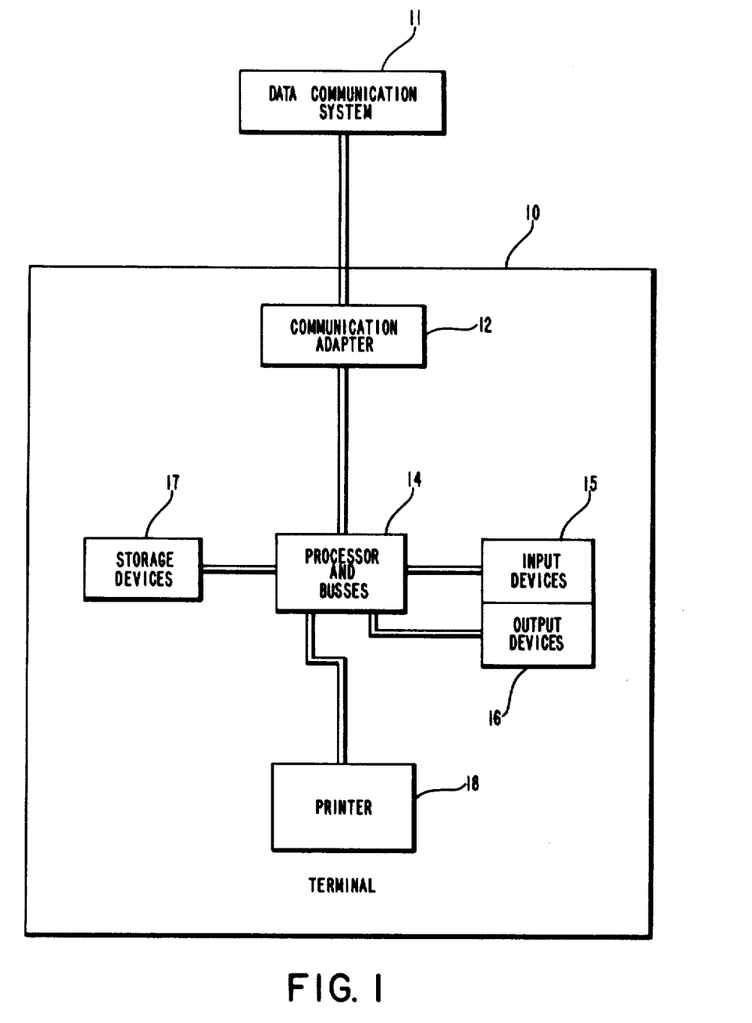
FIG. 1 is a diagrammatic illustration of the apparatus of the present invention.

In FIG. 1, a remote terminal 10 is shown connected to a data communication system 11. The data communication system may comprise one or more host central processing systems or other terminals, capable of communicating via suitable interconnection communication means. Various examples of such systems are well known and understood by those skilled in the art. An example of a host central processing system would be an IBM system 360 Model 65, and an example of a terminal would be an IBM 6670 copier/printer.

Excerpts from manuals describing the IBM 6670 and the 6670 with the IBM System Network architecture and its protocols are appended to the application. These manuals are publically available and specifically comprise: General Information Manual for IBM 6670 Information Distributor, Form No. G544-1006 and Programmer's Guide for Communicating with the IBM 6670 Information Distributor, Form No. G544-1008.

The subject matter of the present invention is referred to and described in the subject manuals. Thus, insofar as any material therein may clarify or add to the present description of the invention, it is incorporated by reference herein.

Briefly, the IBM 6670 includes a communication adapter 12 for communicating with the data communication system 11. The communication adapter includes the logic and wiring to interface between the data communication system 11, e.g., a telephonic data transmission system, and a microprocessor 14. The communication adapter may be of any suitable type, but is preferably that described in the referenced manuals.

The microprocessor 14 and associated busses may comprise any suitable commercially available microprocessor, and preferably is that described in the referenced manuals or in the referenced Hubert patent, as illustrated in FIGS. 2 through 5, described hereinafter. The microprocessor is connected via addressing and data busses to input and output devices 15 and 16, data storage devices 17, and printer 18. An example of an input/output device may comprise a magnetic card read/write device, an example of which is described in the referenced manual. Insofar as the instant invention is concerned, the input device 15 comprising the reader portion of a magnetic card unit serves as an appropriate input device for the operator. This type of input is supplied by means of a recording magnetic card typewriter, which is well known in the industry, and the magnetic card ouptput data is supplied to the mag card reader. Storage device 17 may comprise any suitable memory, such as a diskette, also referred to as a page memory in the referenced Schomburg patent.

The printer 18 comprises the character generator, control register, translator, and entire printing mechanism of the referenced Schomburg patent as mounted in the copy production machine of the referenced Hubert patent. The specific arrangement of the printer mechanism is described in the referenced manuals.

Figure 2:
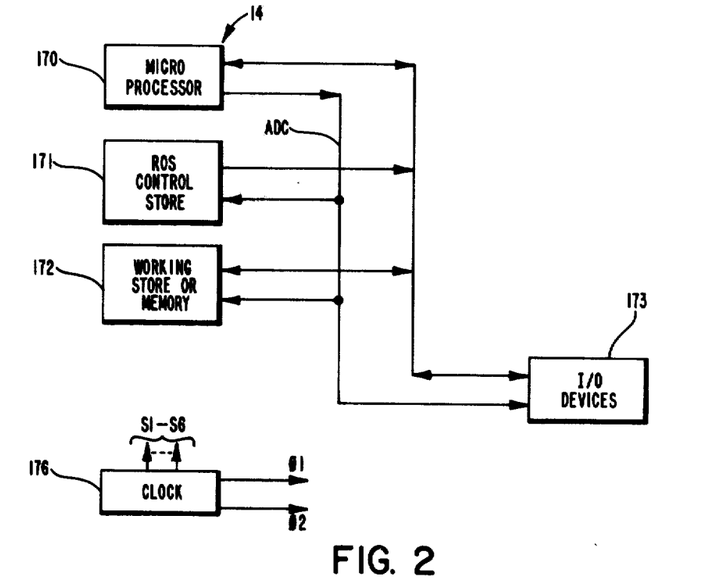
FIG. 2 is a block diagram of programmable control circuits for controlling the machine of FIG. 1 using the present invention.

FIGS. 1 through 5, especially FIG. 2, show the processor system 14 including 14 a programmable microprocessor 170 operating in accordance with a set of control programs contained in ROS control store 171 and using working store or memory 172 as a main or working store. The microprocessor communicates with the other units of the terminal 10 and the other units of the microprocessor system 14 via the input registers 173 and output registers 174. The busses connecting these units are the IO bus having eight bits plus parity and an address bus ADC having sixteen bits. Address signals on the address bus select which units are to send or to receive signals with respect to the microprocessor 170 and the other units. A small memory 175 and a clock 176 are also provided.

Figure 3:
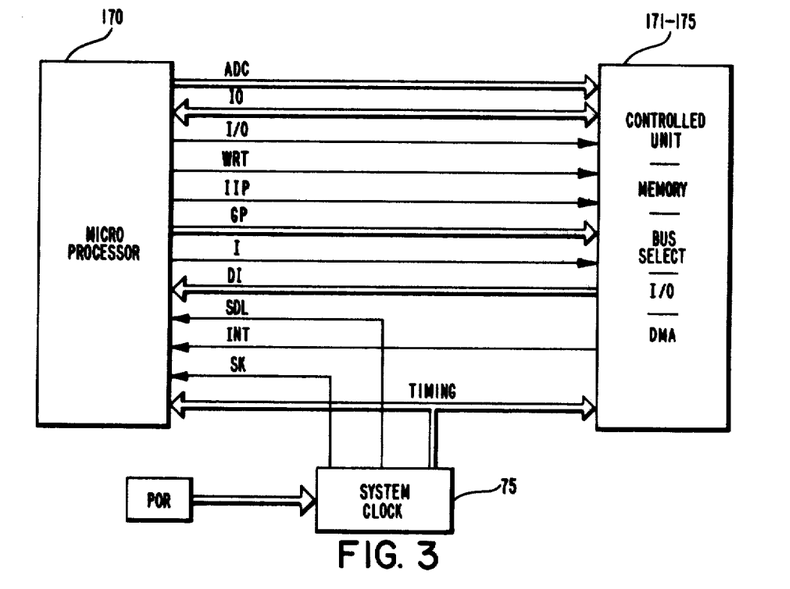
FIG. 3 is a block diagram showing data transfer controls within the FIG. 2 illustrated circuits.

FIG. 3 illustrates the logical interconnections between microprocessor 170 and the controlled units 171-175 of FIG. 2. All the signals on the busses and individual control lines couple to all units with the ADC signals selecting which controlled unit 171-175 is to respond for either receiving data signals or supplying data signals, respectively, over bus I/O. Control lines I/O indicates whether the microprocessor 170 is supplying or receiving signals on bus I/O. When the I/O line has a binary one, it indicates that signal data or instruction signals are to be transferred to the microprocessor 170 over I/O, and a binary zero indicates that the microprocessor 170 is supplying data signals over I/O.

Figure 4:
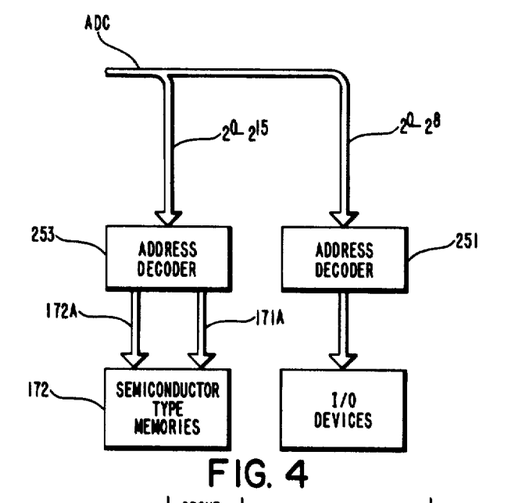
FIG. 4 is a diagram showing addressing elements of the FIG. 2 control circuits.
Figure 5:
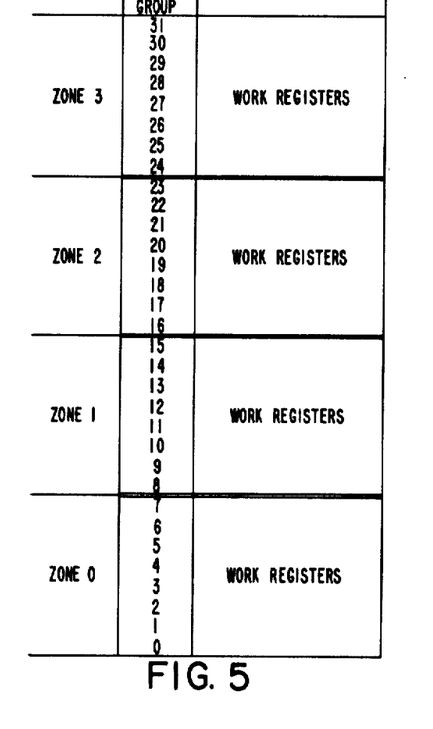
FIG. 5 is a chart showing address definition of certain registers used in the FIG. 2 control circuits.

The memory addressing of microprocessor 170 is shown in FIGS. 4 and 5. The address bus ADC goes to a plurality of address decoders 251 and 253. The lower 1000 bytes of the address space are referred to as the "register area" and are divided into four groups (FIG. 5). Each of the groups include 32 byte addresses. For example, group 0 in zone 0 includes addresses 0-31, and so forth. Decoder 251 transfers data to/from the system I/O devices.

Address decoder 253 addresses ROS control store 171 via address lines 171A and working store memory 172 via address lines 172A to additional memories. All of the address bits from ADC are applied to decoder 253.

Figure 6:
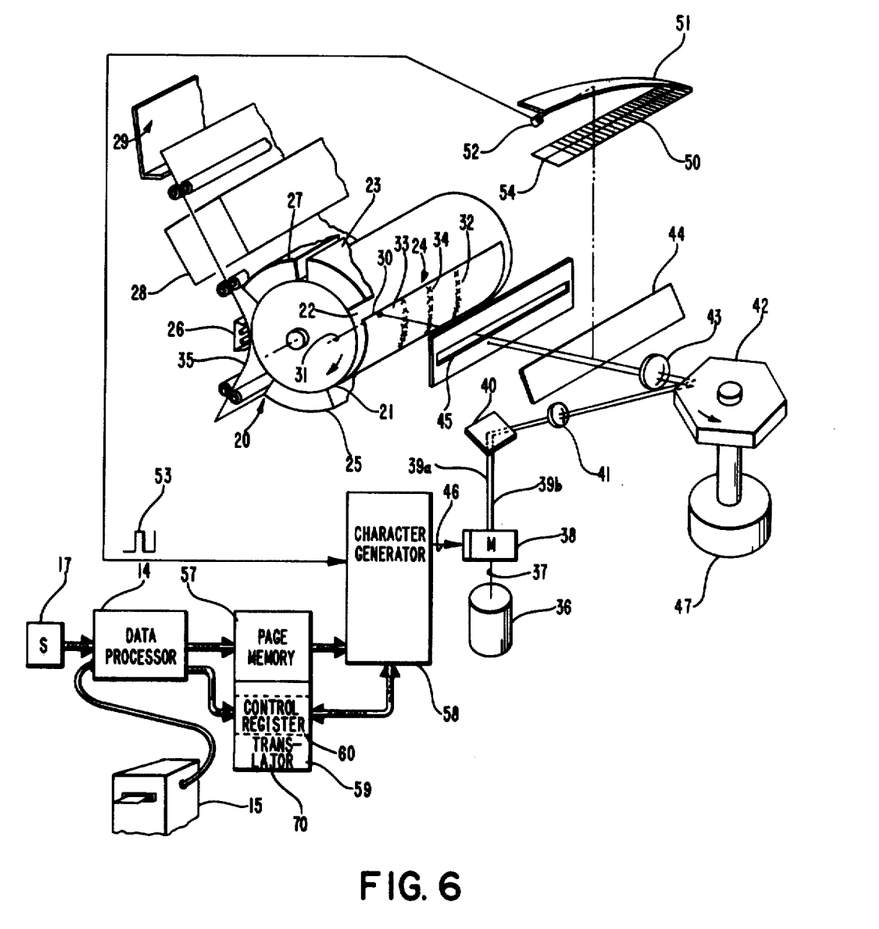
FIG. 6 is a diagrammatic view of a xerographic optical printer of FIG. 1.

FIG. 6 illustrates a xerographic page printer with a block diagram showing the image generation control components employed in conjunction therewith. The page printer 20 includes a xerographic type copy drum 21 providing an image receiving photoconductive surface member 22, which is rotated successively past a charging station 23, an exposure station 24, a development station 25, a transfer station 26, and a cleaning station 27. At exposure station 24, a uniform charge, that was applied to surface 22 at charging station 23, is selectively discharged by a binarly controlled light spot 30 that scan the path 31 extending parallel to the drum 21. Selective exposure by the spot 30 generates binary elements of an electrostatic latent image 32. The latent image 32 is presented to development station 25 where colored thermoplastic resin powder or toner is selectively deposited on the image area 34. The just-developed image is transferred by electrostatic force at station 26 through a support sheet 35. The just-printed sheet 35 is passed through a fixing station 28 where heat or other suitable means causes the toner to adhere to the sheet and form a permanent image. The sheet 35 is then delivered to an exit pocket or tray 29 where it can be removed from the machine. The controlled light spot 30 is generated from the source of high energy, such as a continuous mode laser 36 that projects a laser beam 37 along an optical path through spot control light modulator 38, redirecting mirror 40, lens 41, scan mirror 42, lens 43, beams splitting partial mirror 44, and modulation knife edge 45 to the surface 22. Modulator 38 responds to binary electrical information on its input lines 46 to emit effectively the beam 37 in either of two closely adjacent but slightly different output paths 39a or 39b. If the beam 37 is emitted along output path 39a, it will ultimately be directed past the modulation knife edge 45 and strike the photoconductive surface 22 at spot 30 to discharge the surface and thereby ultimately cause whiter background areas to be produced onto sheet 35. Light emitted along path 39b is intercepted by the modulated knife edge 45 thus does not strike the surface 22. The undischarged surface 22 that remains will develop a toned image at station 25 to form part of the image area final copy sheet 35.

A source of data to be printed, such as data stored in storage device 17 or from magnetic card reading device 15, is controlled by the data processor 14 to assemble the data in a desired format into a page memory 57. In the page memory 57, each character or symbol to be printed, as well as spaces to be inserted between symbols, are recorded at individual memory addresses which are, in turn, associated with the writing lines of a normal page and with the order position of the symbol within the writing line.

Once the text has been assembled in page memory 57, character generation circuitry 58 operates to provide the final dot pattern control to modulator 38. In addition to page memory 57, both data processor 56 and the character generation circuitry 58 have access to memory space in an additional memory 59. Memory 59 also includes the page memory access control 60 and font memory reference address and escapement value table and translator 70.

Translator 70 is a read-only storage memory containing a series of individually addressable multibit font access data words 71, each of which is uniquely addressable by a character/symbol identifying code from page memory 57. Each font access data word 71 contains a font address portion 72 which is a reference address to font memory 92 and a total escapement portion 73 which indicates the total number of raster scans that are required to completely generate the symbol, i.e., the total symbol escapement.

Figure 7:
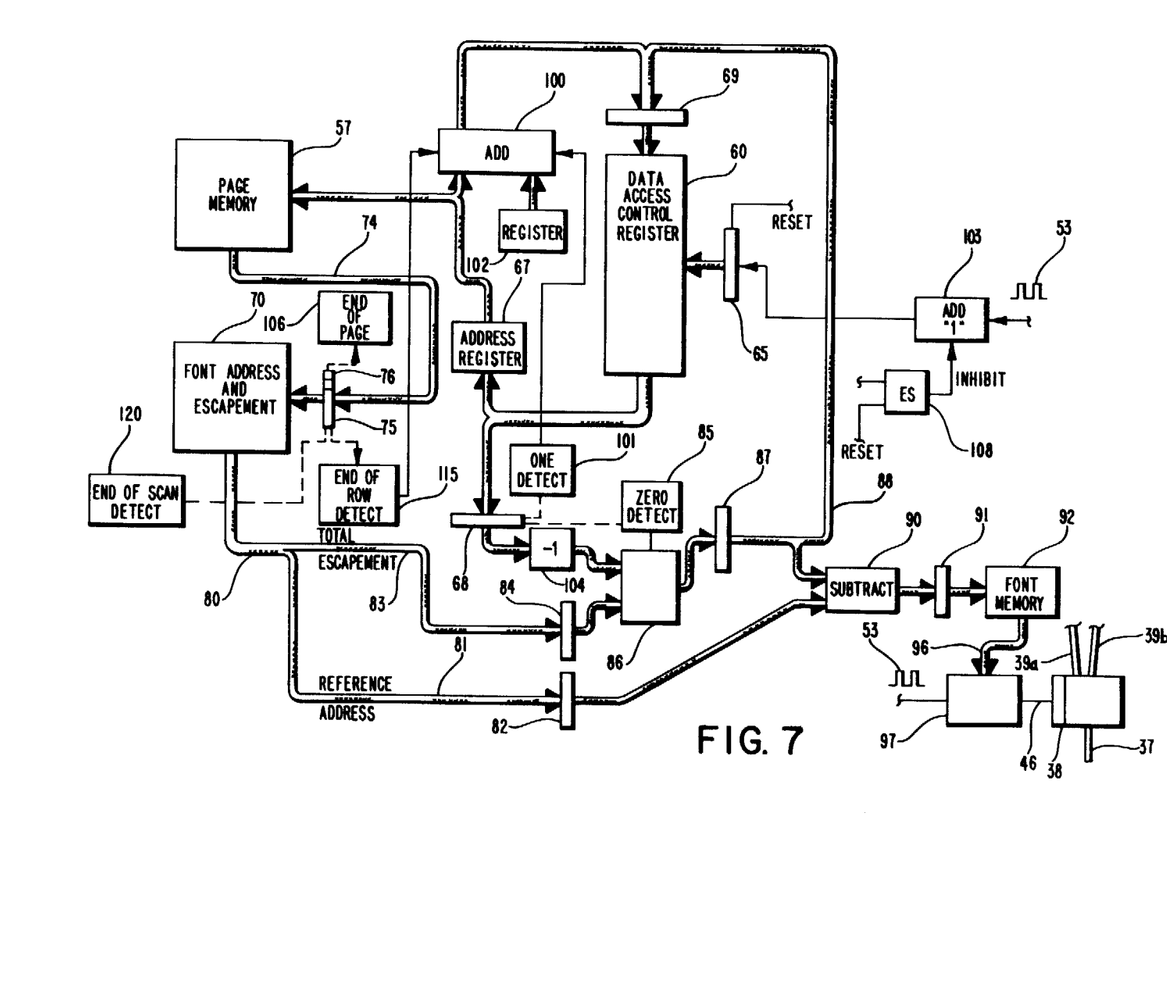
FIG. 7 is a detailed component and data flow diagram of the character generator of FIG. 6.

A more detailed functional component breakdown of the character generating circuitry 58 with page memory 57, control 60 and translator 70 is shown in FIG. 7. Page memory 57 has an output data path 74 to the address register 75 by which a simple identification code with status bits is supplied to the translator 70 as an address. The output path 80 of translator 70 is divided into two components, namely, a font memory reference address path 81 that delivers the font address to register 82, and a total escapement value path 83 that delivers the total escapement portion to total escapement register 84. When the value in running escapement register 68 is "0", detection circuit 85 gates selective data path 86 to pass the total escapement portion from register 84 to remaining escapement register 87, where it is applied along with the font address portion from register 82 delivered to font memory addressing subtraction logic 90 to produce a specific font memory address in address register 91 of font memory 92.

The details of the organization and operation of the printer 18 are contained in the referenced Schomburg patent and are incorporated by reference.

Figure 8:
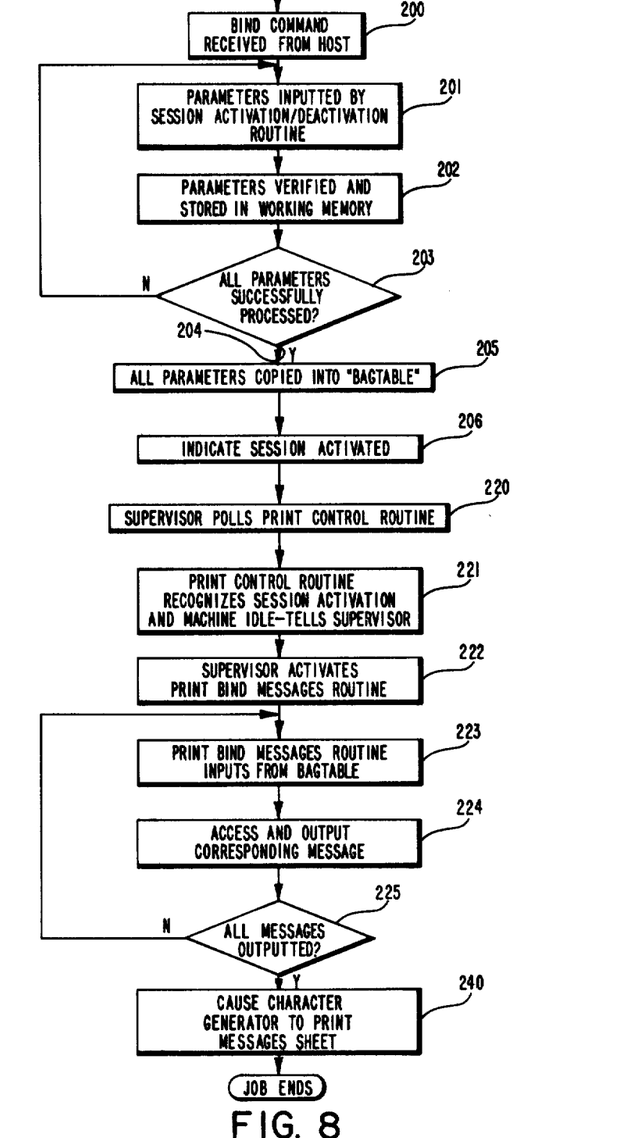
FIG. 8 comprises a process flow diagram of the present invention.

The communication adapter 12 comprises a small buffer and logic for communication by eight-bit byte plus a parity bit to a modem for communication to the data communication system and to the microprocessor system 14. Many commercially available communication adapters of this type exist and their use in the machine is simply one of interfacing. The format of the actual data transmitted via the communication adapter 12 and the protocol and "handshaking" are defined in the appended systems network architecture manual and are accomplished by suitable programs for the microprocessor system 14. In FIG. 8, it is shown how the present invention concerned with capturing in storage the "handshaking" data exchanged between the subject terminal 10 and the data communication system 11 to establish a data link therebetween and presenting the particular data transmission session characteristics to the operator automatically in an easily understandable format (such as an easy to read verbal message format is accomplished). As specific examples, the operator may be informed of data stream characteristics (the code being employed and the alternate code), output device available at the host (card reader, printer, console), and host characteristics, (application programming type, identification).

Translation of the stored handshaking data is accomplished by a direct table lookup addressing technique which may be previously personalized by the implementation of one of eight different languages for presentation to the operator. Exemplary messages in the English language are listed as follows:

SAMPLE MESSAGES:

(1) ALTERNATE CODE PERMITTED/NOT PERMITTED
(2) WP MEDIA 1 PERMITTED/NOT PERMITTED
(3) WP MEDIA 2 PERMITTED/NOT PERMITTED
(4) WP MEDIA 3 PERMITTED/NOT PERMITTED
(5) CONSOLE JOBS PERMITTED/NOT PERMITTED
(6) PRINTER JOBS PERMITTED/NOT PERMITTED
(7) CARD JOBS PERMITTED/NOT PERMITTED
(8) ,MESSAGE JOBS PERMITTED/NOT PERMITTED
(9) MAIN CODE=EBCDIC/ASCII
(10) ALTERNATE CODE=EBCDIC/ASCII
(11) REMOTE SECURITY ID=
(12) IN SESSION WITH

The first message is either printed out "ALTERNATE CODE PERMITTED" or "ALTERNATE CODE NOT PERMITTED." The systems network architecture allows data communication to be conducted utilizing either of two possible standard codes. They are, respectively, "EBCDIC" or "ASCII." SNA is also arranged so that either of two codes may be employed for transmission in a single session, one code called the main code, and the other called the alternate code. The main and alternate codes need not be the same. Handshaking will indicate whether the host system may communicate in both a main and alternate code, in which case the message "ALTERNATE CODE PERMITTED" will be printed, or may be limited to only a main code, in which case the message "ALTERNATE CODE NOT PERMITTED" will be printed.

Messages 2, 3, and 4 will appear as "WP MEDIA X PERMITTED" or "WP MEDIA X NOT PERMITTED." The numeral (X) appearing in the message will be either 1, 2, or 3. The handshaking includes the indication by the host whether certain types of devices or specific equipment is attached to the system and, if so, whether it is available or down. Examples of such devices are a word processing printer or a card reader. Each of these devices likely to be requested is of the word processing family, hence the designation "WP MEDIA." The handshaking indicates only whether all or not all of the devices are available. Hence, if two devices are under consideration, and all of the devices are available, the message will appear "WP MEDIA X PERMITTED." If one of the devices is unavailable, the messages will appear as "WP MEDIA X NOT PERMITTED."

The fifth message concerns the console for the host system and whether communication is allowed to the console. If the handshaking indicates that the console is available for communication therewith, the message will be printed "CONSOLE JOBS PERMITTED." If the console is unavailable for communication, the message will be printed "CONSOLE JOBS NOT PERMITTED."

The sixth message is similar and pertains to a data processing line printer, not a word processing type of printer as discussed with respect to message 2.

Message 7 is similar to the immediately preceeding messages, referring to the availability of a card reader at the host system.

Message 8 refers to operator control messages, such as a message logging on a system. These messages are of the type discussed previously with respect to input device 15 of FIG. 1 and refer to specific data processing types of jobs. They are initiated by a mag card having as its first line ",MES." Thus, the eighth summary sheet message is in a similar form, printing either ",MESSAGE JOB PERMITTED" or ",MESSAGE JOB NOT PERMITTED." Normally, if the data communication system with which the session link has been established is a host computer system, the operator control types of jobs would be permitted, whereas if the data session were established with a terminal, such jobs would not be permitted.

Message 9 simply designates which of the two available data transmission codes is the main code that will be employed. Thus, if the main code permitted was EBCDIC, the message would print "MAIN CODE=EBCDIC." However, if the code permitted by the host were ASCII, the message would print "MAIN CODE=ASCII."

Message 10 is identical to message 8, but refers to the selected code for the alternate code, assuming that message 1 permitted an alternate code.

Message 11 refers to the security identification. In establishing communication via a data session, a security code is sometimes employed. The term "REMOTE" refers to the communication code of the host system. Thus, the terminal operator loads the security identification at the terminal and, if it is the security code of the host, it is matched and communication will begin. The terminal operator may select whether or not the identification will print out. If the operator elects to have the identification printed, it will appear in message 11.

Message 12 refers to an identifier or common name for the host system or for the active application program system of the host with which the communication session is established. These may comprise arbitrarily selected names, such as "NYCVTAM" or "L.A.-CICS".

The operations for receiving and printing the selected messages are illustrated in FIG. 8. In step 200, the "BIND" command is received from the data communication system. This is the command that initiates the session connection sequence. The details of the "BIND" command are described in the accompanying Systems Network Architecture manual, and are specifically detailed in the Appendix A. Upon receipt of a "BIND" command, the communications control program within the terminal activates a "SESSION ACTIVATION AND DEACTIVATION" routine. This program is resident in the microprocessor working memory 172 of FIG. 2. The routine is detailed in FIG. 9 and will be discussed hereinafter. In step 202, the session characteristics are first verified to be acceptable and then temporarily stored internally for later use. Specifically, individual on/off selections are stored in flags and work registers in zone 1 of FIG. 5. Multi-byte option fields (such as the application name and the host machine identification data) are stored in tables in working storage 172 of FIG. 2. When all of the indicators have been analyzed, and stored in the respective memory locations, as indicated by exit 204 from step 203, they are copied in step 205 into a bind agreement table (BAGTABLE), so that they may be sequentially accessed for printing via a simple algorithm. This table is also in the working storage 172 of FIG. 2. In step 206, the session activiation/deactivation routine flags conditions for the system supervisor routine to indicate that a "BIND" has been successfully processed and the session characteristics are ready for presentation to the operator.

Figure 9:
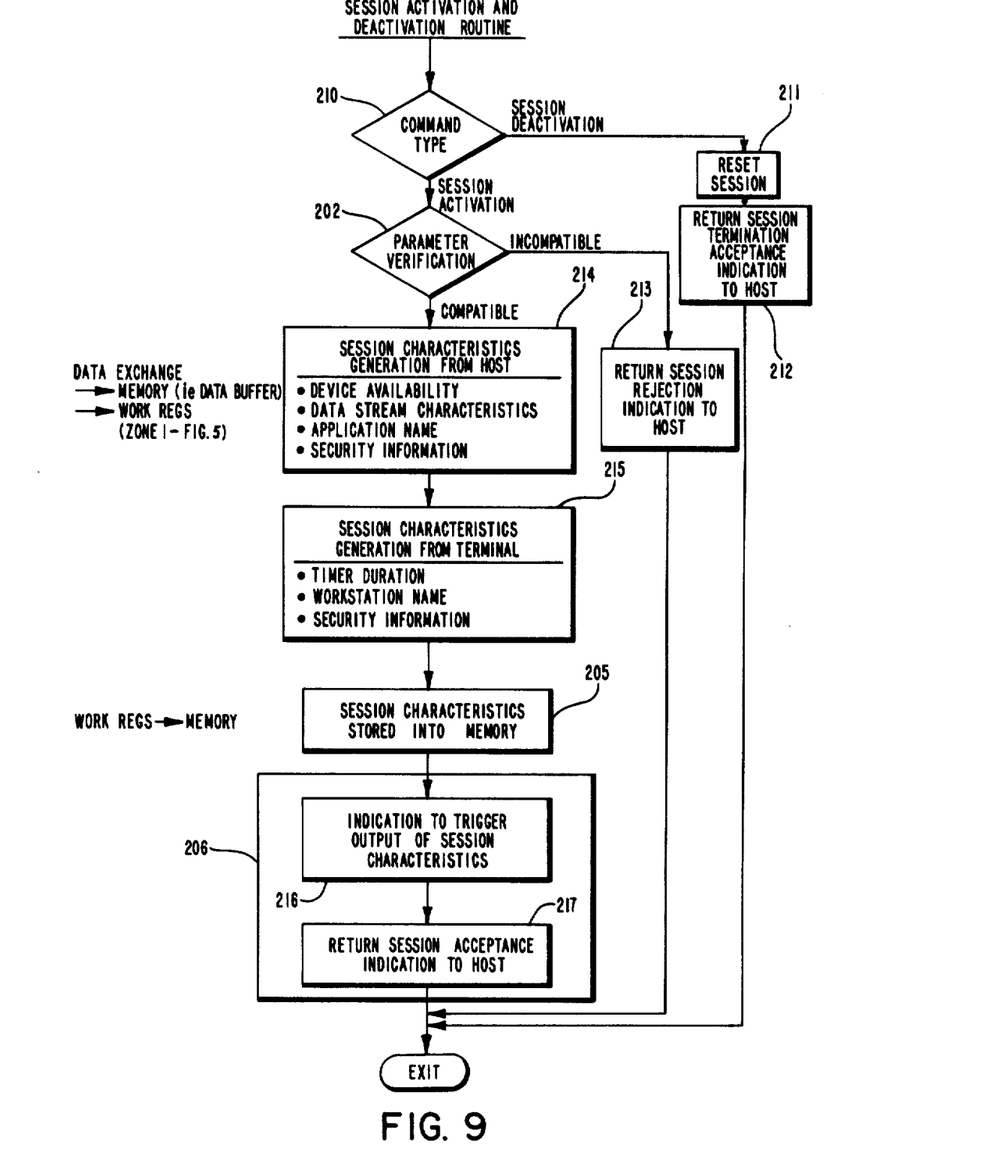
FIG. 9 comprises a process flow diagram of the session activation/deactivation of FIG. 8.

In FIG. 9, the session activation and deactivation routine is shown in more detail. Specifically, step 210 responds to the command type received from the host, which is either session activation or session deactivation. Should the host command as in step 211, the microprocessor resets the session and in step 212 returns the session termination acceptance indication to the host.

Should the command be one of session activation, step 202 of FIG. 8 verifies each parameter with the host. Should the parameters be incompatible, the microprocessor executes step 213 which returns a session rejection indication to the host system. An example of an incompatible parameter would be that the terminal does not match the remote security information. All the parameters, including the various characteristics mentioned in step 214, are sequentially examined and temporarily stored in working memory. Session characteristics may be generated from the terminal and are shown in step 215, but are not important to the invention. In step 205, also shown in FIG. 8, the session characteristics are stored into memory, specifically the "BAGTABLE."

Steps 216 and 217 comprise the indication of the session activation in step 206 of FIG. 8. Specifically, in step 216, the session activation and deactivation routine posts conditions for the system supervisor routine to indicate that a "BIND" has been successfully processed and the session characteristics are ready for presentation to the operator. In step 217, the routine returns a positive response to the host indicating acceptance of the session parameters.

In FIG. 8, step 220 refers to the terminal supervisor program which regularly polls the print control routine to allow it to check for various types of job initiations. In step 221, the polled routine recognizes that the "BIND" characteristics have been successfully processed and that the machine is in an idle condition. It sets indicators which cause the supervisor to transfer control to the BIND MESSAGE PRINT ROUTINE of FIG. 10, in step 222. The BIND MESSAGE PRINT ROUTINE also resides in the processor working memory 172 in FIG. 2.

In FIG. 8, the routine accesses the session characteristics data from "BAGTABLE" in a sequential manner. The session characteristics data result in an accessing of messages from a messages table "BINDTBL", located in the memories 172 (FIG. 4) by step 224. Messages are transferred to the page memory 57 in FIG. 6. In step 225, the microprocessor tests that all messages have been sent and, if not, recycles to access the next indicator.

Figure 10:
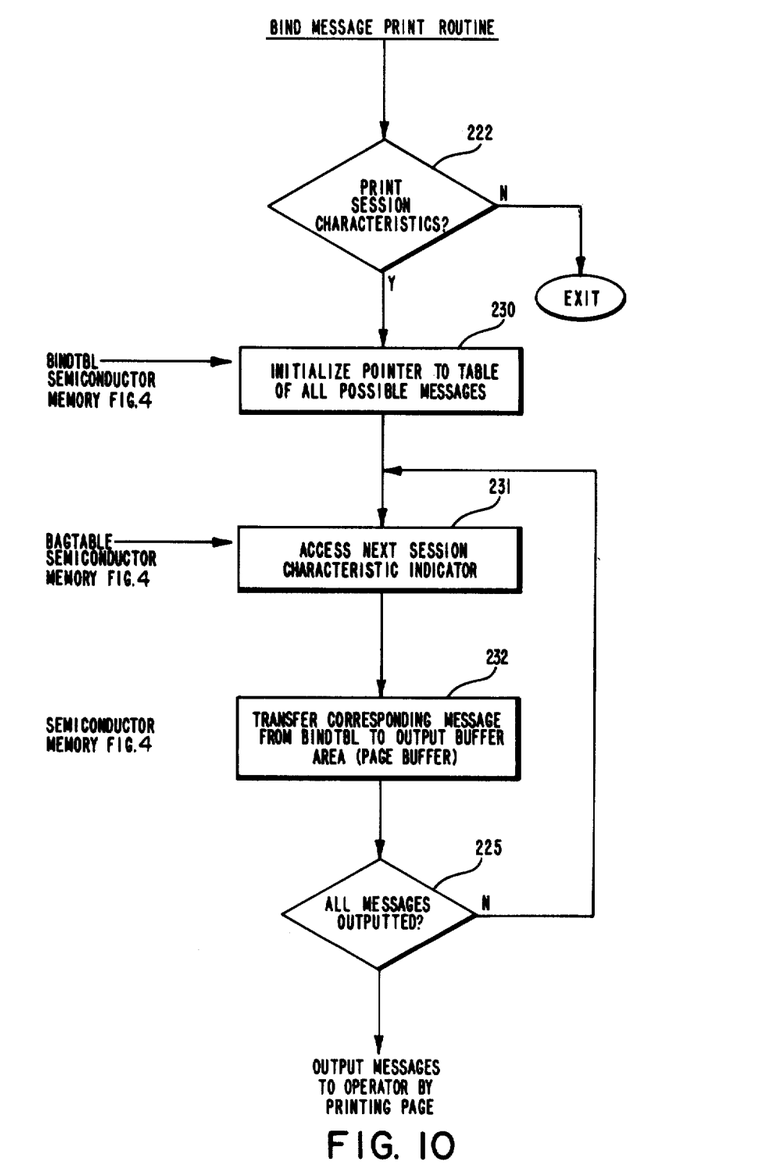
FIG. 10 comprises a process flow diagram of the print/blind messages routine of FIG. 8.

In FIG. 10, the "BIND MESSAGE PRINT ROUTINE" is activated in step 222, and step 230 initializes a pointer to the table of all possible messages. This pointer is located in the "BINDTBL" contained in the semiconductor type memories 172 (FIG. 4). The pointers refer to each session characteristic indicator in the BAGTA- BLE, also contained in working storage 172 in step 231. Specifically, the pointers obtained in step 230 are analyzed and employed to sequentially access the proper message pointers sequentially to the verbal corresponding messages, located in the working store 172, for transfer in step 232 to the output buffer area, the page memory 57 (FIG. 6). Each message is sequentially accessed until step 225 indicates that all messages have been sent and all pointers utilized.

In FIG. 8, step 240 supplies the page containing the generated messages to the character generator of FIG. 6 for printing. This page is printed and exits at pocket 29 so that it is immediately visible to the operator.

The specific pointers examined are as follows: For message number 1, if an alternate code is permitted, bit 4 of byte 6 in the stored handshaking information must be a "1." This indicates that the host permits an alternate code. Other pointers must be examined, however. Specifically, bits 0-3 of byte 25 must be "0" to ensure that noncoded information is excluded by the host from the transmission link. Bits 6 and 7 of byte 23 must be examined for the alternate code specification. Specifically, bit 6 and 7 of byte 23 must be "00," signifying EBCDIC, or "01," specifying ASCII. Thus, if no alternate code is specified, no alternate code can be employed, whether technically permitted by bit 4 of byte 6 or not.

Messages 2, 3, and 4 relating to word processing media require examination of bits 0 and 4 of byte 19 which must be "1" to specify that word processing media is allowed. Otherwise, the media is not allowed. Additional checking must be made, however, of bit 1 of byte 6. For a "1" in bit 0 of byte 21 to be valid, a "1" must be present in bit 1 of byte 6 indicating that there is some device present.

Message 5, referring to the permission of console jobs, is bit 0 of byte 21. This bit must be a "1" in order to be valid. Again, additional checking must be made of bit 1 of byte 6, a "1" indicating that the device is present. For example, a console will not be present if the host system does not include a central processing unit.

The pointer of message 6 for a printer job is similar the bits 0 and 2 of byte 19, must be "1" to indicate that printers are available and permitted. Bit 1 of byte 6 must also be a "1" which indicates that some media exists.

Similarily, in message 7 the card reader availability is checked by means of bit 1 of byte 20 and bit 1 of byte 6 must again be checked. The presence of, or availability of, MESSAGE JOBS in message 8 is detected through bit 0 of byte 22. Specifically, this request is automatically sent with the handshaking, although the operator would not want to transmit the request knowing he was talking to another terminal as opposed to a host.

Message 9 designates the code which is the main code. These are designated by bits 4 and 5 of byte 23, a "00" indicating the EBCDIC code and "01" designating the ASCII code.

For message 10, the code to be used as the alternate code is detected by means of bits 6 and 7 of byte 23. These are the same bits detected with respect to message 1 to verify that there was the possibility of an alternate code. These bits have the same meanings as discussed with respect to message 9.

Message 11 refers to the security identification and to a specific security field contained in the stored handshaking data. This field is designated as "n+2−p." The field is designated a user request correlation field.

The in-session identifier is also located in a field. This field is designated as "k+2−m." This field is designated to indicate a BIND sender's IU name.

While the invention has been particularly shown and described with reference to the above preferred embodiments thereof, it will be understood by those skilled in the art that various changes in form and details may be made therein without departing from the spirit and scope of the invention.

APPENDIX A

BIND COMMAND DETAILS

BIND FORMATS FOR LU TYPE 4

This section defines valid bit settings for the BIND command. The BIND for LU type 4 is sent as a request from a host In the BIND, the BIND sender specifies the session parameters. The format of the BIND request is shown below.

BIND

| Byte | Bits | Values | Discussion |
|---|---|---|---|
| 0 | 0-7 | X'31' | Identifies this RU as a BIND command. |
| 1 | 0-3 | X'0' | Specifies the format of the BIND RU. Only one format has been defined: format 0 (zero). |
| (1) | 4-7 | | Type - denotes the type of BIND to be performed: |
| | | X'0' | Negotiable BIND |
| | | X'1' | Non-negotiable BIND |
| FM (Function Management) Profile | | | |
| 2 | 0-7 | X'07' | FM profile 7 must be used. The FM profile defines the data flow control (DFC) protocols to be used for this session. |
| TS (Transmission Subsystem) Profile | | | |
| 3 | 0-7 | X'07' | TS profile 7 must be used. The TS profile defines the transmission control (TC) protocols to be used for this session. |
| FM Usage | | | |
| (4-7) | | | See bytes 4 through 7 below. |
| BIND Sender's Send Protocols | | | |
| | | | Chaining Use: |
| 4 | 0 | B'0' | Not valid |
| | | B'1' | BIND sender can send single or multiple element chains. |
| | | | Request Mode Selection: |
| (4) | 1 | B'0' | Immediate request mode is used. Only one definite response |

APPENDIX A-continued
BIND COMMAND DETAILS

|   |   |   |   |
|---|---|---|---|
| | | | can be outstanding at a time. That response must be received before the BIND sender can send another RU. |
| | | B'1' | Delayed request mode is used. Multiple definite responses can be outstanding at one time. |
| | | | Note: If delayed request mode is used, the RU sender must be responsible for recovery. |
| | | | Chaining Responses: |
| (4) | 2-3 | B'00' | Not valid |
| | | B'01' | Not valid |
| | | B'10' | Not valid |
| | | B'11' | BIND sender can request definite or exception responses. |
| (4) | 4-5 | | Reserved |
| | | | Compression Indicator: |
| (4) | 6 | B'0' | BIND sender cannot send compressed data. |
| | | B'1' | BIND sender can send compressed data. |
| | | | Send End Bracket Indicator: |
| (4) | 7 | B'0' | BIND sender will not send EB (see byte 6 bit 2) |
| | | B'1' | BIND sender can send EB. |

BIND Receiver's Send Protocols

|   |   |   |   |
|---|---|---|---|
| | | | Chaining Use: |
| 5 | 0 | B'0' | Not valid |
| | | B'1' | BIND receiver can send single or multiple element chains. |
| | | | Request Mode Selection: |
| (5) | 1 | B'0' | Immediate Request Mode is used. BIND receiver can issue a request for a single definite response. No furthur transmission is sent until the BIND receiver receives the requested response. |
| | | B'1' | Delayed request mode is used. BIND receiver allows several definite responses to be outstanding at one time. |
| | | | Note: If delayed request mode is used, the RU sender must be responsible for recovery. |
| | | | Chaining Responses: |
| (5) | 2-3 | B'00' | Not valid |
| | | B'01' | Not valid |
| | | B'10' | Not valid |
| | | B'11' | BIND receiver can request either definite or exception responses. |
| (5) | 4-5 | | Reserved |
| | | | Compression Indicator: |
| (5) | 6 | B'0' | BIND receiver cannot send compressed data. |
| | | B'1' | BIND receiver can send compressed data. |
| | | | Send End Bracket Indicator: |
| (5) | 7 | B'0' | BIND receiver cannot send EB (see byte 6 bit 2) |
| | | B'1' | BIND receiver can send EB. |

Common Protocols for FM Data

|   |   |   |   |
|---|---|---|---|
| 6 | 0 | | Reserved |
| (6) | 1 | B'0' | FM headers not used. |
| | | B'1' | BIND sender and BIND receiver can exchange FM headers. |
| | | | Brackets Usage and Reset State: |
| | | | Note: Brackets are optional in LU type 4. |
| (6) | 2 | B'0' | When brackets are used (byte 4, bit 7 = 1 or byte 5, bit 7 = 1), the bracket state manager's reset states are INB (in brackets). Brackets are not used if neither BIND sender nor receiver will send EB (when byte 4, bit 7 = 0 and byte 5, bit 7 = 0). |
| | | B'1' | Not valid |
| | | | Bracket Termination Rule Selection: |
| (6) | 3 | B'0' | Not valid |
| | | B'1' | Bracket termination rule 1 is used. |
| | | | Note: Bit 3 is reserved if brackets are not used by the session. |
| | | | Alternate Code Selection: |
| (6) | 4 | B'0' | Alternate code set will not be used. |
| | | B'1' | Alternate code set may be used. |
| (6) | 5-7 | | Reserved |
| | | | Normal-Flow Send and Receive Mode Selection: |
| 7 | 0-1 | B'00' | Not valid |
| | | B'01' | Not valid |
| | | B'10' | Half-duplex flip-flop |
| | | B'11' | Reserved |
| | | | Recovery Responsibility: |
| (7) | 2 | B'0' | The contention loser is responsible for any error recovery attempts for the session (asymmetric recovery). |
| | | B'1' | Symmetric responsibility for recovery. The sender of data is responsible for recovery. |
| | | | Contention Winner/Loser: |
| (7) | 3 | B'0' | BIND receiver is contention winner and BIND sender is contention loser. |
| | | B'1' | BIND sender is contention winner and BIND receiver is contention loser. |

APPENDIX A-continued

BIND COMMAND DETAILS

| | | | |
|---|---|---|---|
| | | | Note: Byte 7, bit 3, is reserved if there is symmetric responsibility for recovery (when byte 7, bit 2 = 1). For asymmetric recovery (when byte 7, bit 2 = 0), the session partner responsible for recovery is the contention loser identified in byte 7, bit 3. |
| (7) | 4–6 | | Reserved |
| | | | Half-Duplex Flip-Flop (HDX-FF) Reset States: |
| (7) | 7 | B'0' | Not valid. |
| | | B'1' | HDX-FF reset state is SEND for the BIND sender and RECEIVE for the BIND receiver (that is, the BIND sender sends normal-flow requests first after session activation or reset). |
| TS Usage | | | |
| (8–13) | | | See bytes 8 through 13 below. |
| | | | Staging Indicator and Pacing Count for BIND-receiver CPMGR (connection point manager) to BIND-sender CPMGR normal flow: |
| 8 | 0 | B'0' | Pacing in this direction occurs in one stage. |
| | | B'1' | Pacing in this direction occurs in two stages. |
| | | | Note 1: When the session involves a boundary function, pacing may occur in two stages. For the definition of a boundary function, see SNA Format and Protocol Reference Manual: Architecture Logic. |
| | | | Note 2: The meanings of 0 and 1 are reversed from the staging indicator for BIND-sender CPMGR to BIND-receiver CPMGR (see byte 12). |
| (8) | 1 | | Reserved |
| (8) | 2–7 | B'nnnnnn' | BIND-receiver CPMGR's send pacing count. A value of 000000 means no pacing of requests flowing from the BIND receiver. |
| 9 | 0–1 | | Reserved |
| (9) | 2–7 | B'nnnnnn' | BIND-receiver CPMGR's receive pacing count. A value of 000000 causes the boundary function to substitute the value set by a system definition pacing parameter (if the system definition includes such a parameter) before it sends the BIND RU on to the BIND receiver. A value of 000000 received at the BIND receiver is interpreted to mean no pacing of requests flowing to the BIND receiver. |
| | | | Maximum RU Size: |
| 10 | | X'ab' | Maximum RU size sent on the normal flow by the BIND receiver. This value represents the largest RU that can be sent. It is expressed as a mantissa and an exponent value of 2 by which the mantissa is multiplied. For example, when the mantissa is 8 and the exponent is 5 (X'85'), the RU size is 256 bytes ($8 \times 2^5$). |
| | | | When bit 0 is set to zero, no maximum is specified and the remaining bits 1–7 are ignored. When bit 0 is set to one, the byte is interpreted as X'ab'. See IFAP Volume 1 for these values. |
| 11 | | X'ab' | Maximum RU size sent on the normal flow by the BIND sender. This value represents the largest RU that can be sent by the BIND sender and is specified in the same format as the BIND receiver (byte 10). |
| | | | Staging Indicator and Pacing Count for BIND-sender CPMGR to BIND-receiver CPMGR normal flow: |
| 12 | 0 | B'0' | Pacing in this direction occurs in two stages. |
| | | B'1' | Pacing in this direction occurs in one stage. |
| | | | Note: The meanings of 0 and 1 are reversed from the staging indicator for BIND-receiver CPMGR to BIND-sender CPMGR (see byte 8, notes 1 and 2). |
| (12) | 1 | | Reserved |
| (12) | 2–7 | B'nnnnnn' | BIND-sender CPMGR's (connection point manager's) send pacing count. A value of 000000 means no pacing of requests flowing from the BIND sender. |
| | | | For single-stage pacing in the BIND sender to BIND receiver direction, this field is redundant with, and will indicate the same value as, the BIND-receiver CPMGR's receive pacing count (see byte 9, bits 2–7 above). |
| 13 | 0–1 | | Reserved |
| (13) | 2–7 | B'nnnnnn' | BIND-sender CPMGR's receive pacing count. A value of 000000 means no pacing of requests that flow to the BIND sender. For single-stage pacing in the BIND receiver to BIND sender direction, this field is redundant with, and will indicate the same value as, the BIND-receiver CPMGR's send pacing count (see byte 8, bits 2–7 above). |
| PS Profile | | | |
| (14–25) | | | See bytes 14 through 25 below. |
| 14 | 0 | B'0' | PS usage field format is the basic format. |
| | | B'1' | Reserved |
| (14) | 1–7 | B'0000100' | LU Type 4 |
| PS Usage | | | |
| 15–18 | | | BIND SENDER TO BIND RECEIVER DIRECTION OF FLOW |

APPENDIX A-continued
BIND COMMAND DETAILS

| | | | |
|---|---|---|---|
| 15 | | | Printer Data Stream Profiles |
| | | | (Profiles are defined under |
| | | | "Data Stream Profiles.") |
| | 0 | | Base DSP |
| | | 0 | Not supported |
| | | 1 | Supported |
| | 1 | | General Data Stream |
| | | 0 | Not supported |
| | | 1 | Supported |
| | 2 | | Job Data Stream |
| | | 0 | Not supported |
| | | 1 | Supported |
| | 3 | | Reserved |
| | 4 | | WP Raw Form |
| | | 0 | Not supported |
| | | 1 | Supported |
| | 5-7 | | Reserved |
| | | | Note: Base DSP with NL and FF is part of all other printer |
| | | | DSPs. If bit 0 = 0, no printer is supported on BIND receiver. |
| | | | If bit 1, 2, or 4 is set to 1, bit 0 must also be 1. |
| 16 | | | Additional Data Stream Profiles |
| | | | (X'00' = no additional media) |
| | | | For bits 1 through 7 below: |
| | | 0 | Not supported |
| | | 1 | Supported |
| | 0 | | OII Level 1 |
| | 1 | | Card |
| | 2 | | OII Level 2 |
| | 3 | | Basic Exchange |
| | 4 | | Reserved |
| | 5 | | Word Processing Exchange Diskette |
| | 6 | | OII Level 3 |
| | 7 | | Document Interchange |
| 17 | | | Console Data Stream Profiles |
| | 0-3 | | Console Definition |
| | 0 | | Base DSP (see Note 1) |
| | | 0 | No console supported (see Note 2) |
| | | 1 | Supported |
| | 1 | | General Data Stream |
| | | 0 | Not supported |
| | | 1 | Supported (see Note 3) |
| | 2 | | Job Data Stream |
| | | 0 | Not supported |
| | | 1 | Supported (see Note 3) |
| | 3-7 | | Reserved |
| | | | Note: Base DSP with NL and FF is part of all other console |
| | | | DSPs. If bit 0 = 0, no console is supported on BIND receiver. |
| | | | If bit 1 or 2 is set to 1, bit 0 must also be 1. |
| 18 | | | FM and FMH Usage |
| | 0 | | Supervisory Services FM data |
| | | 0 | Not supported |
| | | 1 | Supported |
| | 1-2 | | Destination-Selection Stack |
| | | 00 | 1-level stack |
| | | 01 | 2-level stack |
| | | 10 | Reserved |
| | | 11 | 3-level stack |
| | 3 | | Compaction |
| | | 0 | Not supported |
| | | 1 | Supported |
| | 4 | | PDIR for all media |
| | | | (PDIR is peripheral data information record) |
| | | 0 | Not supported |
| | | 1 | Supported |
| | 5 | | Reserved |
| | 6 | | QUERY FOR DATA SET FMH-2 |
| | | 0 | Not supported |
| | | 1 | Supported |
| | 7 | 0 | BIND receiver need not receive CD on every EDS |
| | | | (end of destination selection) |
| | | 1 | BIND receiver must receive CD on every EDS |
| 19-22 | | | BIND RECEIVER TO BIND SENDER DIRECTION |
| | | | OF FLOW |
| | | | (Same format as bytes 15-18.) |
| 19 | | | Printer Data Stream Profiles |
| | 0 | | Base DSP |
| | | 0 | Not supported |
| | | 1 | Supported |
| | 1 | | General Data Stream |
| | | 0 | Not supported |
| | | 1 | Supported |

APPENDIX A-continued
BIND COMMAND DETAILS

| | | | |
|---|---|---|---|
| | 2 | | Job Data Stream |
| | | 0 | Not supported |
| | | 1 | Supported |
| | 3 | | Reserved |
| | 4 | | WP Raw Form |
| | | 0 | Not supported |
| | | 1 | Supported |
| | 5-7 | | Reserved |
| | | | Note: Base DSP with NL and FF is part of all other printer DSPs. If bit 0 = 0, no printer is supported on BIND sender. If bit 1, 2, or 4 is set to 1, bit 0 must be 1. |
| 20 | | | Additional Data Stream Profiles (X'00' = no additional media) For bits 0 through 7 below: |
| | | 0 | Not supported |
| | | 1 | Supported |
| | 0 | | OII Level 1 |
| | 1 | | Card |
| | 2 | | OII Level 2 |
| | 3 | | Basic Exchange |
| | 4 | | Reserved |
| | 5 | | Word Processing Exchange Diskette |
| | 6 | | OII Level 3 |
| | 7 | | Document Interchange |
| 21 | | | Console Data Stream Profiles |
| | 0-3 | | Console Definition |
| | 0 | | Base DSP |
| | | 0 | Not supported |
| | | 1 | Supported |
| | 1 | | General Data Stream |
| | | 0 | Not supported |
| | | 1 | Supported |
| | 2 | | Job Data Stream |
| | | 0 | Not supported |
| | | 1 | Supported |
| | 3-7 | | Reserved |
| | | | Note: Base DSP with NL and FF is part of all other console DSPs. If bit 0 = 0, no console is supported on BIND sender. If bit 1 or 2 is set to 1, bit 0 must also be 1. |
| 22 | | | FM and FMH Usage |
| | 0 | | Supervisory Services FM data |
| | | 0 | Not supported |
| | | 1 | Supported |
| | 1-2 | | Destination-Selection Stack |
| | | 00 | 1-level stack |
| | | 01 | 2-level stack |
| | | 10 | Reserved |
| | | 11 | 3-level stack |
| | 3 | | Compaction |
| | | 0 | Not supported |
| | | 1 | Supported |
| | 4 | | PDIR for all media |
| | | 0 | Not supported |
| | | 1 | Supported |
| | 5 | | Reserved |
| | 6 | | QUERY FOR DATA SET FMH-2 |
| | | 0 | Not supported |
| | | 1 | Supported |
| | 7 | 0 | BIND sender need not receive CD on every EDS (end of destination selection) |
| | | 1 | BIND sender must receive CD on every EDS |
| 23 | | | Code Selection |
| | 0-3 | | Repertoire |
| | | | Note: Bits 0-3 are not defined for the non-negotiable BIND. Use bits 4-7 instead. |
| | 4-5 | | Code 0 (Main Code) Selection. Specifies the encoding of character fields in code 0 during the session. |
| | | 00 | EBCDIC |
| | | 01 | ASCII or ISCII or ITA #5 |
| | | | Other values reserved |
| | 6-7 | | Code 1 (Alternate Code) Selection. Selects the alternate code for the session. |
| | | 00 | EBCDIC |
| | | 01 | ASCII or ISCII or ITA #5 |
| | | | Other values reserved |
| 24 | | | General Characteristics |
| | 0-1 | | Reserved |
| | 2 | 0 | BIND sender may send data first |
| | | 1 | BIND receiver must send data first |

APPENDIX A-continued

BIND COMMAND DETAILS

| | | | |
|---|---|---|---|
| | 3 | | Reserved |
| | 4 | 0 | BIND receiver will initiate attended mode (Where operator is available to handle intervention-required and other operator responses.) |
| | | 1 | BIND receiver will initiate unattended mode |
| | 5 | 0 | During session BIND receiver will not alternate between attended and unattended mode |
| | | 1 | During session BIND receiver may alternate between attended and unattended mode |
| | 6–7 | | Reserved |
| 25 | | | NCI Characteristics |
| | 0–3 | | NCI data types |
| | 0 | 0 | Image data not supported |
| | | 1 | Image data supported |
| | 1 | 0 | Speech data not supported |
| | | 1 | Speech data supported |
| | 2–3 | | Reserved |
| | 4–7 | | Reserved |
| Cryptography Options | | | |
| 26 | 0–1 | | Private or end-user cryptography options: |
| | | B'00' | No private or end-user cryptography supported. |
| | | B'01' | Private cryptography supported. The session cryptography key and cryptography protocols are privately supplied by the end-user. |
| | | B'10' | End-user cryptography supported. The session cryptography key is distributed by the SSCP and LU; the cryptography protocols are privately supplied by the end-user. |
| | | B'11' | Reserved |
| (26) | 2–3 | | Session-level cryptography options: |
| | | B'00' | No session-level cryptography supported. |
| | | B'01' | Session-level selective cryptography supported. All cryptography key management is supported by the SSCP and LU; exchange (using +RSP to BIND) and verification (using CRV) of the cryptography session-seed value are supported by the LUs for the session. All FM data requests with EDI (enciphered data indicator) on are enciphered/deciphered. |
| | | B'10' | Reserved |
| | | B'11' | Session-level mandatory cryptography supported; same as session-level selective cryptography except all FM data requests are enciphered/deciphered. |
| (26) | 4–7 | | Session-level and/or end-user cryptography options field length: |
| | | X'0' | No session-level or end-user cryptography specified. The cryptography option fields (bytes 27–k) are omitted. |
| | | X'9' | Session-level and/or end-user cryptography specified. Additional options follow in the next nine bytes. |
| 27 | 0–1 | | Session cryptography key encipherment mode: |
| | | B'00' | Session cryptography key enciphered under BIND receiver (or SLU) master cryptography key using a seed value of zero (only value defined). |
| (27) | 2–4 | | Reserved |
| (27) | 5–7 | | Cryptography cipher method: |
| | | B'000' | Block chaining with seed and cipher text feedback, using the Data Encryption Standard (DES) algorithm (only value defined). |
| 28 – k | | | Session cryptography key enciphered under BIND receiver (or SLU) master cryptography key; and eight-byte value that, when deciphered, yields the session cryptography key used for enciphering and deciphering FM data requests. |
| Names and End-User Data | | | |
| k + 1 | | | Length of BIND sender's name in field k + 2 – m. |
| | | X'00' | Field k + 2 – m does not exist. |
| | | X'nn' | Field k + 2 – m contains the number of bytes specified (cannot exceed X'08'). |
| k + 2 – m | | | BIND sender's LU name. |
| m + 1 | | | Length of user data in field m + 2 – n. |
| | | X'00' | Field m + 2 – n does not exist. |
| | | X'nn' | Field m + 2 – n contains the number of bytes specified. |
| m + 2 – n | | | User data. |
| n + 1 | | | Length of user request correlation field. |
| | | X'00' | Field n + 2 – p does not exist. |
| | | X'nn' | Field n + 2 – p contains the number of bytes specified. |
| n + 2 – p | | | User request correlation field. |
| p + 1 | | | Length of BIND receiver's name in field p + 2 – r. |
| | | X'00' | Field p + 2 – r does not exist. |
| | | X'nn' | Field p + 2 – r contains the number of bytes specified (cannot exceed X'08'). |
| p + 2 – r | | | BIND receiver's LU name. |

APPENDIX A-continued

BIND COMMAND DETAILS

Definitions for BIND

The following definitions apply to bytes 14 to 25 of the BIND command:

1. LU Type (Byte 14):
   This field specifies LU session type 4 and thus identifies the format and field definitions for bytes 15 through 25.
2. BIND Sender to BIND Receiver Flow (Bytes 15 to 18):
   This field defines the proposed session parameters for the BIND sender's send capability and, therefore, the BIND receiver's receive capability. Acceptance of the BIND by the BIND receiver means that these session parameters apply to this direction of transmission.
3. BIND Receiver to BIND Sender Flow (Bytes 19 to 22):
   This field defines the proposed session parameters for the BIND receiver's send capability and, therefore, the sender's receive capability. Acceptance of the BIND by the BIND receiver means that these session parameters apply to this direction of transmission.
4. Code Selection (Byte 23):
   The Code Selection Repertoire (bits 0 to 3) is not defined in the non-negotiable BIND. Any setting of bits in this field conveys no meaningful information.
   The code 0 Selection field (bits 4 and 5) defines the code for use in the session as the Main Code (that is, for an RU in which the Code Selection Indicator in the RH is set to "zero").
   The Code 1 Selection field (bits 6 and 7) defines the code for use in the session as the Alternate Code (that is, for an RU in which the Code Selection Indicator is set to "one").
   The code selection indicator in the request header (RH) allows for an individual RU to be represented in an alternate code. If the indicator is "zero", the main code is used; if "one", the alternate code is used. For those RUs containing FM headers, the header is never subject to alternate coding.
   If Alternate Code is not to be used in the session (that is, it bit 4 of byte 6 of the BIND command is set to "zero"), then the Code 1 Selection field is meaningless. If byte 25 of BIND is non-zero, alternate code 1 means NCI, when NCI destination selection is active.
5. General Characteristics (Byte 24):
   This field defines general characteristics proposed for the session. Acceptance of the BIND by the BIND receiver means that these parameters apply to the session.
6. NCI Characteristics (Byte 25):
   This field defines characteristics for non-coded information exchange, for digital facsimile and audio.
7. Cryptography and End-User Options (Bytes 26 to r):
   The Main Code (code 0), as specified in BIND byte 23, must be used for all fields containing character data.

What is claimed is:

1. In a data communication system of the type wherein a data terminal means can be coupled via a data link means for carrying signals representative of data, a portion of said data signals comprising protocol parameters for establishing the communication procedures between said terminal means and said data communication system, the improvement comprising:
   means for displaying said protocol parameters to a user of said data terminal means, said displaying means comprising
   memory means in said data terminal means for storing said portion of said data signals comprising protocol parameters received by said data terminal means from said data communication system;
   converting means coupled to said memory means for retrieving said stored protocol parameters and for converting said protocol parameters to a predetermined format; and
   output means coupled to said converting means for supplying output data indicative of said protocol parameters to said data terminal means.

2. The invention claimed in claim 1, wherein said output means includes means for manifesting said output data as visual data.

3. A method for manifesting protocol parameters controlling a data session between a data communication system and a data terminal device, wherein said data session is established by the exchange of said protocol parameters between said system and said device, comprising the steps of:
   storing said protocol parameters;
   converting said protocol parameters to predetermine formatted information;
   supplying said formatted information to an output device; and
   providing visual output information indicative of said protocol parameters.

* * * * *